(12) United States Patent
Ince

(10) Patent No.: US 7,114,285 B1
(45) Date of Patent: Oct. 3, 2006

(54) SNAGLESS ARTIFICIAL FISHING LURE WITH PECTORAL APPENDAGES, AND WITH A SNAG GUARD AND TOP-MOUNTED HOOK CONFIGURATION

(76) Inventor: Jerome Rousseau Ince, 1306 Palm Ridge Ct., Canton, GA (US) 30115

( * ) Notice: Subject to any disclaimer, the term of this patent is extended or adjusted under 35 U.S.C. 154(b) by 0 days.

(21) Appl. No.: 11/205,375

(22) Filed: Aug. 17, 2005

Related U.S. Application Data

(60) Provisional application No. 60/602,578, filed on Aug. 18, 2004.

(51) Int. Cl.
*A01K 85/00* (2006.01)

(52) U.S. Cl. .................. 43/42.26; 43/42.24; 43/42.27; 43/42.28; 43/42.09

(58) Field of Classification Search ............... 43/42.26, 43/42.24, 42.27, 42.28, 42.09, 42.06
See application file for complete search history.

(56) References Cited

U.S. PATENT DOCUMENTS

| | | | |
|---|---|---|---|
| 1,976,695 A | 10/1934 | Boehm | |
| 2,155,335 A * | 4/1939 | Sleeper et al. | 43/42.46 |
| 2,462,828 A * | 2/1949 | Parnell, Sr. | 43/42.24 |
| 2,582,687 A | 1/1952 | Fisher | |
| 2,621,439 A | 12/1952 | Leidel | |
| 3,205,609 A | 9/1965 | Knapton | |
| 3,863,378 A * | 2/1975 | Walker | 43/42.28 |
| 3,902,265 A | 9/1975 | Pond | |
| 4,337,591 A | 7/1982 | Gell | |
| 4,953,319 A * | 9/1990 | Kasper et al. | 43/42.06 |
| 5,261,182 A * | 11/1993 | Link | 43/42.36 |
| 5,428,918 A * | 7/1995 | Garrison | 43/42.28 |
| 5,440,830 A | 8/1995 | Smith | |
| 5,456,039 A * | 10/1995 | Pisoni et al. | 43/42.24 |
| 5,491,927 A * | 2/1996 | Ortiz | 43/42.28 |
| 5,625,975 A * | 5/1997 | Imes | 43/42.09 |
| 5,661,921 A * | 9/1997 | Mason | 43/42.09 |
| 5,822,913 A * | 10/1998 | Lau | 43/42 |
| 5,899,015 A * | 5/1999 | Link | 43/42.39 |
| 6,113,895 A * | 9/2000 | McCain | 424/84 |
| 6,564,499 B1 * | 5/2003 | Firmin | 43/42.26 |
| 6,675,525 B1 * | 1/2004 | Ford | 43/42.24 |

* cited by examiner

*Primary Examiner*—Darren W. Ark
*Assistant Examiner*—John D. Holman

(57) ABSTRACT

A snagless, artificial fishing lure body 10, with a collar 30 and attached pectoral appendages 34 providing added action, and with a snag guard 16 and top-mounted hook 18 configuration to provide weedless and/or snagless operation. Composed of a wood, metal or plastic, injection molded body, and in the fishing lure classes of crankbait, jerkbait, stickbait, topwater or minnowbait or other names used for these types of generally, diving lures. The preferred embodiment of the lure body 10, a crankbait, possesses a channel 12 encircling the lure body 10, and in which the removable collar 30 with protruding appendages 34 resides during use. The preferred embodiment of the snag guard 16 is comprised of stainless steel, and the top-mounted hook 18 is in a single hook configuration.

4 Claims, 3 Drawing Sheets

Figure 1:
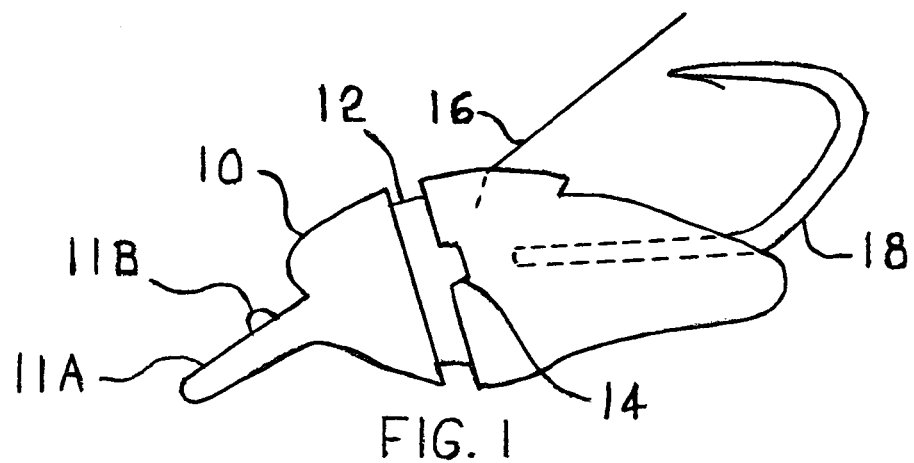

SNAGLESS ARTIFICIAL FISHING LURE WITH PECTORAL APPENDAGES, AND WITH A SNAG GUARD AND TOP-MOUNTED HOOK CONFIGURATION

CROSS-REFERENCE TO RELATED APPLICATIONS

This application claims the benefit of provisional patent application Appl No. 60/602,578, filed Aug. 18, 2004.

FEDERALLY SPONSORED RESEARCH

Not Applicable

SEQUENCE LISTING OR PROGRAM

Not Applicable

BACKGROUND OF THE INVENTION—FIELD OF INVENTION

This invention generally relates to artificial fishing lures, specifically to improvements which provide added action, improved hooking and snagless operation.

BACKGROUND OF THE INVENTION—PRIOR ART

Fishermen are confounded by their quarry which they can see, literally, or on sonar devices now standard equipment on new boats and quite commonly used to locate fish or the underwater obstructions, known as "structure", that they prefer to orient to. Previous to this invention, commercially available fishing lures, those lures actually available in the marketplace and known in the industry as crankbaits, topwaters, jerkbaits and minnowbaits, etc. incorporated no additionally movement or action other than that created by their own simple designs and inherent movement through the water when retrieved by the fisherman; basic wiggling, wobbling, etc.

And, until this invention, these commercially available lures have all been manufactured with a plurality of hooks. It is not at all uncommon for one of these lures to have 6, 9 or even 12 hooks hanging downward from the lure; toward weeds, debris and underwater snags of all kinds. These hooks, by their orientation on the underside of the lure, snag the weeds or other debris on the surface or under water and immediately render a cast useless as fish almost never attack a lure that has debris clinging to it; whatever action was being imparted is minimized at best when debris interferes with such action. This nuisance requires the fisherman to clean the debris away from the lure prior to casting the lure again—if the fisherman is lucky and can in fact retrieve the lure from these snags. Thus, the plurality of hooks that the fishermen is led to believe improves their chances of landing fish, actually does not lead to landing more fish, but simply causes the above snagging scenario to be repeated all too often and to the exasperation of fishermen worldwide.

Finally, until this invention, the commercially available class of lures mentioned above has been manufactured without a built-in weed guard or snag guard device that would cause debris and obstructions to be deflected away from the hook(s) prior to the hook point coming into contact with such debris and obstructions.

Inventors have attempted to add action to these lures in a variety of ways. However, a very few patents addressing all the above mentioned shortcomings, if any, have actually gone on to production and commercial availability. Instead, the vast majority of these inventions incorporate unworkable solutions that simply cannot be made commercially and/or prove not viable in actual fishing conditions. A good example of this is the prior art as evidenced in U.S. Pat. No. 5,661,921. While this invention provides the potential for added action, the solution is not tenable in that it cannot be made in commercial quantities with the hard-plastic, injection molding technology available as of 2005. The channel required to add the desired added action in that prior art is not possible to be manufactured in commercial quantities with current injection molding technology. A significant problem also exists in this prior art in that if the fisherman wants to remove the molded fin apparatus from the lure, the hook configuration of this prior art would not readily allow this, and the fisherman would be forced to cut their line in order to remove and replace the molded fin apparatus. Nor is the fin apparatus likely to add any significant action, even with the interesting, albeit overly complex water channeling design as specified in this prior art.

Another example of an invention that attempts to address the problems associated with a plurality of hooks issue is U.S. Pat. No. 2,582,687. In this invention, the single hook successfully reduces the overall number of exposed hooks, however the point of this hook is positioned downward, actually toward the very debris and the problem that a reduction in hooks is meant to address.

Another very similar example is U.S. Pat. No. 3,902,265. In this invention, the plurality of hooks issue is addressed rightly, but the manufacture and/or real world usage is not possible. This invention, like all interesting prior art found to date, is rendered irrelevant since insofar as it can not be put into actual fishing use.

In summary, all this prior art examined is lacking in one or more of the above critically fundamental areas of a.) improving action, b.) reducing the frequency of snagging weeds, debris of underwater snags, and c.) affecting a good, solid hook set in the upper jaw of the fish; a hooking position known in the industry to be the best position offering the highest chances of actually landing the hooked fish.

However, this invention described herein provides a very elegant and commercially viable solution to the demands of adding action by a much improved fin apparatus, removing the plurality of hooks and thereby reducing the chances of snagging considerably by the use of a deflecting snag guard, and effecting a top-jaw hooking by having the hook(s) mounted on the top of the lure rather than the bottom or side. This invention is already in production and commercially available within the United States of America.

BACKGROUND OF INVENTION—OBJECTS AND ADVANTAGES

Accordingly, besides the objects and advantages of this invention as described briefly above, several objects and advantages of the present invention are:

(a) to provide a means to add action to a variety of artificial lures such as the class of crankbaits, stickbaits, topwaters, minnowbaits and jerkbaits, etc.

(b) to provide a means for this added action to be applied in such a way as to be both effective and able to be mass produced in commercial quantities;

(c) to provide a means by which the device enabling added action can be readily removed or replaced without the need for first cutting the fishing line;

(d) to provide a top-mounted hook configuration that renders a variety of artificial lure classes such as crankbaits, stickbaits, topwaters, minnowbaits and jerkbaits, etc. virtually weedless and snagless while also dramatically improving the land to hook ratio, and (e) to provide a snag guard mechanism that further improves the weedless and snagless operation of this invention, and also improves the landing ratio qualities that the hook configuration only begins;

Further objects and advantages and their impact to the fishermen's success will become apparent from a more detailed consideration of the ensuing description and drawings. These will indicate an invention that is at once effective and beneficial to the fisherman, and that is able to be produced in commercial quantities; in fact this is already being done.

SUMMARY

In accordance with the present invention, this is an artificial lure that comprises a collar with protruding pectoral appendages of heretofore unseen positioning and sensitivity, and thereby such appendages are very active and mobile during retrieval through the water enabling needed added action. The positioning of the collar onto the lure body itself is improved in that the angle of attack, in relation to the lure's travel angle through the water while being retrieved by the fisherman is square to such angle. Two locking tabs manufactured into the collar, one on each side of the collar, provide a means by which the collar is always in the appropriate position for best use. These locking tabs fit into similarly located and sized receiving channels on the lure body. When both locking tabs are positioned in their respective receiving channels, the fisherman is assured that the collar is correctly positioned for maximum action. The manufacture and positioning of the pectoral appendages on the collar is critical to maximizing the free and sensitive movement of such appendages. The pectoral appendages as designed in this invention are manufactured in such a manner as to first protrude outward and away from the collar, and thereby outward and away from the lure body itself. This positioning, over prior art, now allows for unencumbered movement of the appendages as the appendages are held away from the lure body and are free to move independent of the lure body and the hydrologic forces that exist around the body when it is moved through water. The appendages are also tapered to decrease the resistance force of water against them, thus making the appendages more sensitive to slight movement of the lure body. This adds significant action to the lure and thereby improves the lure's attractiveness to fish, increasing the strike ratio per cast for the fisherman. Finally, and very importantly, the collar is positioned onto the lure body itself at such an angle so as to cause the appendages to be square to the downward direction of the lure as the lure is being retrieved. This positioning allows for better mobility of the appendages because they are not fighting against the direction of travel on retrieve; in fact they are square to this angle.

This invention also provides for an artificial lure that comprises a hook configuration that is also heretofore unseen in prior art. The hook configuration in this invention is manufactured in such a way that the hook shaft is partially embedded in the lure body during the actual injection molding process of the lure body rather than added to the lure body afterwards as an afterthought. Said hook shaft is positioned within the lure body whereby the hook shaft is pointed directly toward the line tie, and the hook point is directed upward, away from debris and obstructions such as weeds, wood and rock that may be on the surface or underwater, thereby very appreciably increasing the likelihood that the lure will be retrieved through the entire cast without snagging any of these obstructions. This configuration provides the proper orientation of a hook on a fishing lure in three critical aspects: First, the shaft is angled toward the line tie. This causes the line of pull between fisherman and fish to be direct and in line with each other. If the shaft were angled in any other direction than straight at the line tie, hooking and landing fish would be significantly compromised. If angled in a direction below the line tie, the hooking capability would suffer. If angled in a direction above the line tie, the capability of landing the fish would suffer. Second, the hook configuration of this invention does not come into contact with obstructions during retrieve as it is always oriented above and out of the way of such obstructions. Third, but very importantly, this top-mounted hook configuration generally causes the fish to become hooked in its upper jaw which significantly increases the chance the fisherman will successfully land the hooked fish.

Noticeably absent is the plurality of hook hanging devices commonly seen on most if not all commercial lures of this class. These hangers are commonly used to hang treble hooks from and are found on virtually all commercially available lures of this class of lures.

Additionally, this invention also provides a snag guard device that further protects the top-mounted hook from obstructions commonly found in or on the water. The snag guard of this invention is positioned in such a manner so as to cause deflection of the lure away from any obstructions prior to the hook point coming into contact or close proximity with such obstructions. The angle of attack of this snag guard is also important and such that the more extreme pressure of the fish's lips during the attack on the lure will cause the snag guard to collapse sufficiently to cause the hook point to now come into contact with the fish's lips and thereby causing the fish to become hooked. And an also very important feature of this invention, is that the material used to construct the snag guard is sufficiently strong such that when the fish does become hooked, the snag guard actually now creates a downward force against the fish's mouth making the hook significantly harder to become extricated from the fish, thereby allowing the fisherman to land more fish before the fish can thrash and ultimately throw or otherwise escape from the lure.

DRAWINGS—BRIEF DESCRIPTION

FIG. 1 Side view of the preferred embodiment lure, a crankbait, including diving bill or lip, line tie, and clearly showing the receiving channel that receives the collar, and more clearly showing the locking tab receiving channel, the top-mounted, single hook and the snag guard.

Figure 2:
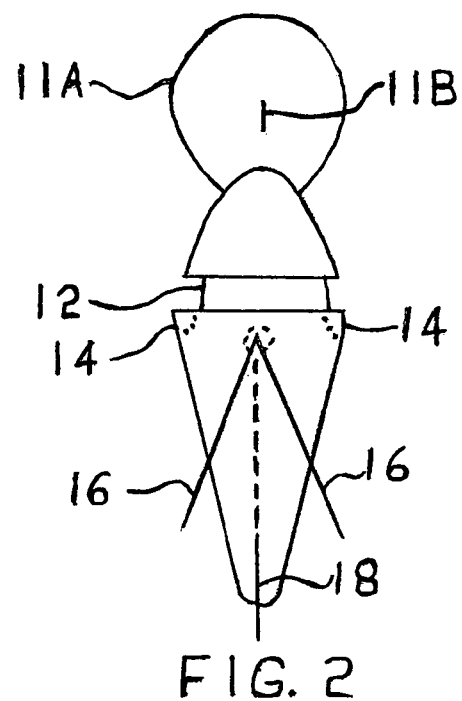

FIG. 2 Top view of the preferred embodiment lure, a crankbait, including diving bill or lip, line tie, and clearly showing the receiving channel that receives the collar. The top-mounted, single hook and the snag guard are also shown.

Figure 3:
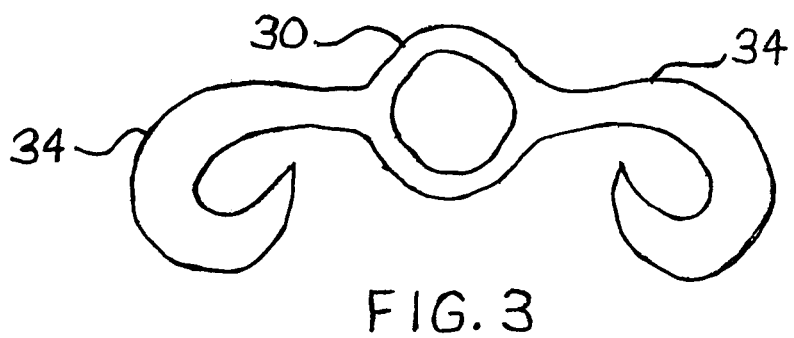

FIG. 3 Detail of the collar referenced in FIG. 1 and in its preferred pectoral appendage embodiment; viewed as if laying on a flat surface.

Figure 4:
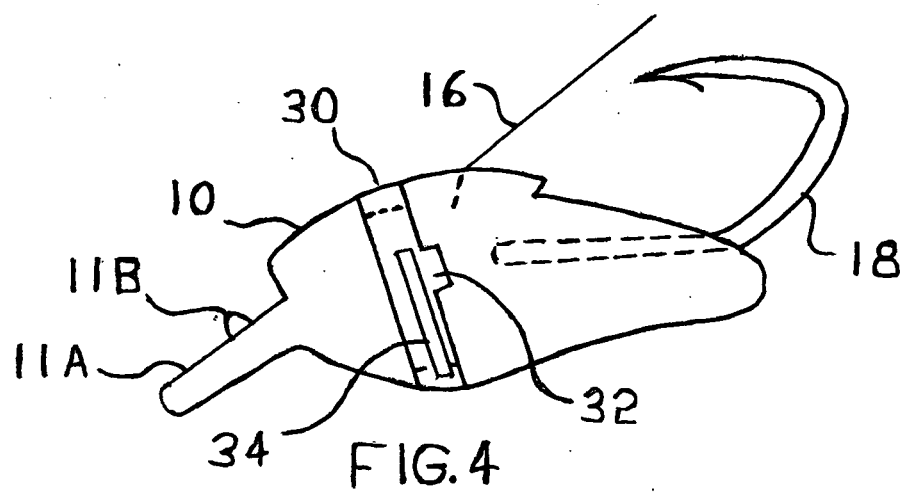

FIG. 4 Side view showing the preferred embodiment lure, a crankbait, including diving bill or lip, line tie, and clearly showing the collar with its preferred embodiment pectoral appendages and residing within the collar's receiving channel referenced in FIG. 1.

Figure 5:
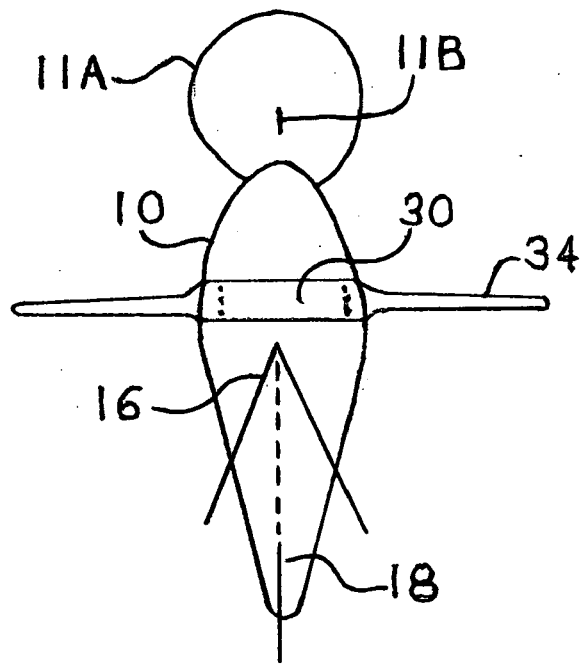

FIG. 5 Top view showing the preferred embodiment lure, a crankbait, including diving bill or lip, and clearly showing the collar with its preferred embodiment pectoral appendages in place and residing within the collar's receiving channel. The top-mounted, single hook and snag guard configuration are also shown.

Figure 6:
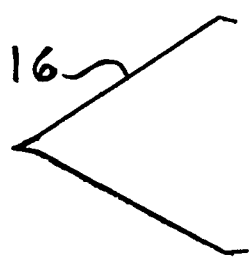

FIG. 6 Detail of the snag guard apparatus in its preferred embodiment, a stainless steel wire structure, and shown in FIG. 1; viewed as if laying on a flat surface, so as to more clearly see its design structure.

Figure 7:
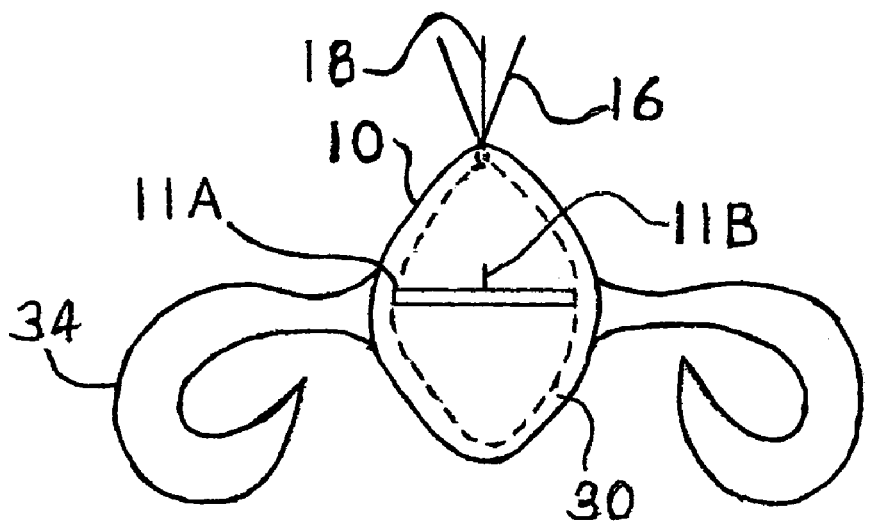

FIG. 7 Front view of the complete preferred embodiment lure, a crankbait, including diving bill or lip, line tie, collar with preferred embodiment pectoral appendages in place and residing within the collar's receiving channel. The top-mounted, single hook and wire snag guard configuration are also shown.

Figure 8:
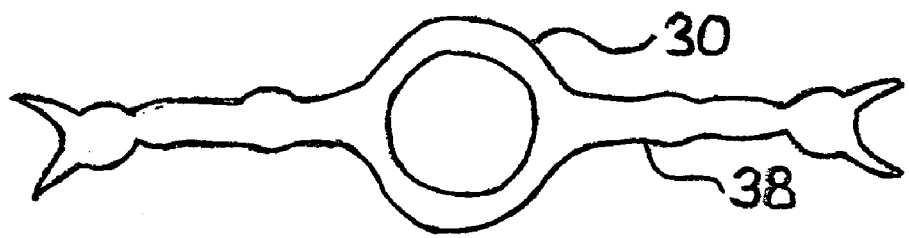

FIG. 8 Detail of the collar in an additional pectoral appendage embodiment, crawdad claws, so as to see positioning of the pectoral appendages relevant to the collar.

Figure 9:
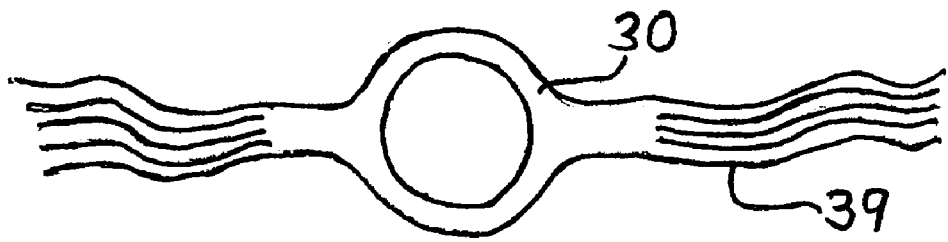

FIG. 9 Detail of the collar in an additional pectoral appendage embodiment, a plurality of highly flexible and active tentacles, so as to see positioning of the pectoral appendages relevant to the collar.

| DRAWINGS--REFERENCE NUMERALS | |
|---|---|
| FIG. 1 | |
| 10 | Lure Body |
| 11A | Diving bill or lip |
| 11B | Line tie |
| 12 | Collar receiving channel |
| 14 | Collar locking tab receiving channel |
| 16 | Snag guard |
| 18 | Top-mounted, preferred embodiment single hook |
| FIG. 2 | |
| 10 | Lure Body |
| 11A | Diving bill or lip |
| 11B | Line tie |
| 12 | Collar receiving channel |
| 14 | Collar locking tab receiving channel |
| 16 | Snag guard |
| 18 | Top-mounted, preferred embodiment single hook |
| FIG. 3 | |
| 30 | Collar |
| 34 | Pectoral appendage |
| FIG. 4 | |
| 10 | Lure body |
| 11A | Diving bill or lip |
| 11B | Line tie |
| 30 | Collar |
| 34 | Collar appendage |
| 16 | Snag guard |
| 18 | Top-mounted, preferred embodiment single hook |
| FIG. 5 | |
| 10 | Lure body |
| 11A | Diving bill or lip |
| 11B | Line tie |
| 30 | Collar |
| 34 | Pectoral appendage |
| 16 | Snag guard |
| 18 | Top-mounted, preferred embodiment single hook |
| FIG. 6 | |
| 16 | Snag guard |
| FIG. 7 | |
| 10 | Lure Body |
| 11A | Diving bill or lip |
| 11B | Line tie |

-continued

| DRAWINGS--REFERENCE NUMERALS | |
|---|---|
| 30 | Collar |
| 16 | Snag guard |
| 18 | Top-mounted, preferred embodiment single hook |
| FIG. 8 Alternative embodiment collar - pectoral appendages | |
| 30 | Collar |
| 38 | Pectoral appendage - in the form of Crawdad claws |
| FIG. 9 Alternative embodiment collar - pectoral appendages | |
| 30 | Collar |
| 39 | Pectoral appendage - in the form of plurality of tentacles |

FIGS. 1, 2, 3, 4, 5, 6, 7 Detailed Description—Preferred Embodiment A preferred embodiment of the present invention is illustrated in FIG. 1 (top view), FIG. 2 (side view), FIG. 3 (detail of collar), FIG. 4 (side view with collar in place), FIG. 5 (top view with collar in place) and FIG. 6 (detail of snag guard). As shown in FIG. 1, the preferred embodiment, a crankbait lure, has a main lure body 10 preferably comprised of hard plastic. It could also be made of other materials such as hard rubber, wood, metal, etc. The lure body includes a diving bill or lip 11A which causes the lure body 10 to dive downward into the water when the lure is retrieved by the fisherman after casting. An eyelet 11B is manufactured into the diving bill or lip 11A, or the lure body 10, and is used for tying a fishing line to the lure itself. Encircling the lure body 10 is a channel 12 that receives the collar 30 and contains the collar 30 while the lure body 10 is in use by the fisherman. The collar 30 is also held in place within the channel 12 on the lure body 10 by means of two locking tabs 32 and two collar locking tab receiving channels 14. The collar 30 is comprised of a material that allows for repeatedly being stretched, flexed, bent, straightened and otherwise manipulated without fracturing. Examples of such material include soft plastic common to the fishing industry, soft plastic impregnated with salt, anise oil, or other scent attractants, etc. Soft plastic is the preferred material because it is readily available in a multitude of shapes, and is moderately priced. Two pectoral appendages 34 protrude outward away from the collar 30, one pectoral appendage 34 on each side of the collar 30, and thereby protrude outward away from each side of the lure body 10 itself. As the collar and appendages are a single part, these appendages are also comprised of a material that allows for repeatedly being stretched, flexed, bent, straightened and otherwise manipulated without fracturing.

Said pectoral appendages 34 are manufactured by a means that provides that the pectoral appendages first protrude well outward and away from the collar 30, and thereby away from the lure body 10. Then, the pectoral appendages 34 are slightly tapered to their far tips so as to provide increased sensitivity and thereby facilitate ultimate action in the water when the lure body 10 is being retrieved by the fisherman.

The preferred embodiment also includes the top-mounted, single hook 18 which is partially embedded within the body of the lure body 10 during manufacture. The preferred embodiment also utilizes a snag guard 16 comprised of stainless steel wire that is also set into the back of the lure body 10, forward of the hook point and secured there during manufacture.

Noticeably absent from this invention are hook hangers that normally protrude from artificial lure bodies of this lure class. Because this invention utilizes a superior top-mounted hook 18 and snag guard 16 configuration as depicted in FIG. 1 and others within this application, no hook hangers are required or even desired.

FIGS. 1, 2, 3, 4, 5, 6, 7 Operation—Preferred Embodiment

The manner in which the preferred embodiment is used is exactly as that of any other artificial crankbait lure of this class. The fisherman casts the lure out, and begins their retrieval of the lure through the water until the lure is fully retrieved and another cast is repeated. This cast and retrieve operation is accomplished by various means, commonly through the use of rod and reel. Instead of retrieving the lure immediately, the lure can also be allowed to swim behind a moving boat as in a trolling operation.

Preferred embodiment of the collar 30 and pectoral appendages 34 is of a construction using soft plastic material common to the fishing industry and which is very flexible and elastic.

FIGS. 8, 9 Additional Embodiments and Operation

FIGS. 8 and 9 illustrate only two additional embodiments and this is not to be construed as an exhaustive listing of possible additional or alternative embodiments. FIG. 8 shows the pectoral appendages of the collar manufactured to resemble a crustacean's claws. Most game fish in the United States commonly prey upon crayfish, and this embodiment of the appendages mimics the front claws of crayfish. FIG. 9 shows the pectoral appendages of the collar as a plurality of tentacles.

The additional embodiments of the collar and pectoral appendages as discussed above are also of a construction using soft plastic material as in the preferred embodiment of the collar. This is not to indicate that the embodiment of collar and pectoral appendages cannot be constructed using a wide variety of rubber or plastic materials, feathers, etc.

The operation of these additional embodiments of the collar and pectoral appendages is the same as with the preferred embodiment.

Advantages

From the description above, a number of advantages of the snagless artificial fishing lure with pectoral appendages, snag guard and top-mounted hook configuration invention become readily evident:

a) The easily removable and replaceable collar allows the fishermen to keep this lure tied to their line while changing collars, however other prior art examined and utilizing this collar mechanism requires cutting the fishing line in order to remove and replace the collar.

b) The angled position of the collar relative to the lure body is correct in that it is square to the direction of downward, angled travel. Resistance and thereby reduced action is minimized to its lowest point physically possible.

c) The pectoral appendages protruding well out and away from the collar and lure body allow for very significantly improved mobility and action over any prior art attempting this design.

d) The multiplicity of appendages that may be successfully embodied in the collar apparatus indicates the appropriateness and thereby the elegance of this design in its ability to add action to the lure in a variety of manifestations rather than inhibit it.

e) The preferred pectoral appendage embodiment especially, provides extraordinary action due to the fin shape. The slightest movement of the lure body causes this fin to stretch an unravel rearward with a dominant wiggling action.

f) The removal of all hook hangers and their obligatory dangling treble hooks is of prime importance to fishermen and a marked improvement over prior art and commercially available lures on the market. Instead, this invention incorporates a partially embedded, permanently and top-mounted, wide-gap hook manufactured into the lure body rather than being affixed in some manner afterwards to the exterior of the lure body. Immediately, the implication of this is apparent in that the fishermen can fish this lure in and around debris such as weeds or underwater snags where fish hide, without the fear of snagging this debris or worse, losing their expensive lure on perhaps the very first cast.

g) This invention provides a snag guard that deflects obstructions and debris away from the point of the hook prior to the hook coming into proximity of such obstructions or debris.

h) The snag guard also keeps pressure on the fish's lips whenever a fish is hooked to further reduce the incidence of that fish throwing the lure and escaping. Prior art may incorporate deflection devices, but none on this class of lures nor so elegant in design as in this invention that the deflection design doubles in usefulness in that it provides a means for securing the hooked fish to the lure.

i) Finally and perhaps most importantly, this invention is already in production and being sold nationally to fishermen fishing for many different species; proving the viability of this invention to actually be made available to fishermen in commercial quantities, and bring its value to them in daily use.

CONCLUSION, RAMIFICATIONS, AND SCOPE

Accordingly the reader will see that this invention's elegant design allows fishermen to utilize a very adaptive lure that provides more and better action by way of the angled collar and multiple pectoral appendage embodiments. And, by way of the additional protection against snagging obstructions and debris that the invention's snag guard enables, the snag guard also facilitates the fish being kept on the hook and actually be landed by the device's resulting pressing against the fish's mouth, instead of allowing the thrashing fish to throw the lure during the ensuing fight. Finally, the top-mounted hook(s) provide for superior hooking in the fish's upper jaw. Hooking in the upper jaw is known to improve the fisherman's chances of actually landing the hooked fish.

The lure bodies that can readily incorporate this invention are any of the following classes: crankbait, topwater, jerkbait, stickbait, minnowbait, etc. The lure bodies can be manufactured from hard plastic, wood, metal or any other suitably firm material that can bear up to the rigors of fighting game fish. The invention has been successfully incorporated into all the above lure classes in sizes used for bass on up to large musky and striper. The invention is of course adaptable to lures used in fishing for salt water species as well.

The collar and pectoral appendages can be manufactured of any flexible and elastic material such as, but not limited to, the soft plastic commonly used in the fishing lure industry. Pectoral appendages fashioned from feathers have been successfully incorporated. The collar, in its soft plastic embodiment may be approximately 3/16" wide by approximately ⅛" thick. The comparable channel that encircles the lure body is appropriately sized so that the collar, when placed within the channel for use, fits snugly and the outer surface of the collar is flush with the lure body itself to minimize resistance when retrieved. The collar and pectoral appendages can be color coordinated to the lure body, contrasted in color to the lure body, or a combination such that perhaps the color is color coordinated to the lure body, but the appendages are of a contrasting color.

The snag guard can be manufactured of a variety of materials such as soft plastic, hard plastic, rubber, wire or cable. The preferred embodiment snag guard is of a thin stainless steel wire structure. Another preferred embodiment of the snag guard is that each wire end at the end of the 'V' shape has an approximate ⅛" dog leg bend downward and slightly inward. The reason for this is that this keeps the wire ends from being impaled into the fish's mouth during the attack which can at times prevent the fish being hooked. The snag guard's 'V' shape should be suitably long enough to protect whatever size hook is used.

The top-mounted hook(s) should be matched to the size of the lure body being manufactured. The size of the hook(s) would be smaller for lures sized for bass than the hook(s) sized for the larger lures sized for musky. A variety of hook styles have been successfully incorporated into this invention such as O' Shaughnessy, Sickle and Round Bend. Many other styles would of course be usable in this invention. Hooks sized for bass lures may be 1/0–8/0 while hooks sized for musky lures may be 5/0–10/0.

While the above description contains many specificities, these should not be construed as limitations on the scope of the invention, but merely as illustrations of some of the presently preferred and/or additional or alternative embodiments of this invention. Many other ramifications and variations are possible within the teachings of the invention. For example, the pectoral appendages may be manufactured using a dissolvable material that is impregnated with fish attracting scents that are emitted as the lure is retrieved through the water. Rather than replacing the collar, replaceable pectoral appendages could be inserted into the more permanent collar itself rather than the two elements being manufactured as one part as is the present preferred embodiment.

Thus the scope of the invention should be determined by the appended claims and their legal equivalents, and not by the examples offered.

I claim:
1. An artificial fishing lure comprising:
 a) a body having a top portion, a bottom portion, a front portion, and a rear portion, where said front portion has the shape of a diving bill, whereby said lure dives downward when water moves past it;
 b) a circumferential channel around said body located closer to said front portion than said rear portion and having two opposing locking tab receiving channels extending transversely from said circumferential channel toward said rear portion;
 c) an eyelet on said front portion for tying a fishing line to said body;
 d) a removable elastic collar within said channel, wherein said elastic collar has two opposing locking tabs that fit into said two opposing locking tab receiving channels to hold said collar in place;
 e) a single hook embedded in said rear portion and directed in an upward direction;
 f) a snag guard that comprises a stainless steel wire comprising two equal portions of said wire extending outward and rearward from a single location in the shape of a "V" embedded in to said top portion of said body for deflecting obstructions or debris away from said hook, wherein said collar comprises a plurality of flexible appendages emanating at first outward and away from said collar, and then rearward to the direction of normal travel of said lure, and
 wherein said collar is placed in said channel and is removed from said channel by slipping said collar over said snag guard, said hook, and said rear portion.

2. The artificial fishing lure of claim 1 wherein said appendages contain a dissolvable fish-attracting scent.

3. The artificial fishing lure of claim 1 wherein said appendages resemble a crustacean's claws.

4. The artificial fishing lure of claim 1 wherein said appendages resemble a plurality of tentacles.

* * * * *